(12) United States Patent
Shea (10) Patent No.: US 6,229,680 B1
(45) Date of Patent: May 8, 2001

(54) APPARATUS AND METHOD FOR OPTICALLY DETECTING ARCING FAULTS IN ELECTRIC POWER SYSTEMS IN THE PRESENCE OF OTHER LIGHT SOURCES

(75) Inventor: John Joseph Shea, Pittsburgh, PA (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/376,072

(22) Filed: Aug. 16, 1999

(51) Int. Cl.[7] ....................................................... H02H 3/00
(52) U.S. Cl. ........................ 361/42; 361/78; 250/227.11
(58) Field of Search .................................. 361/42, 78, 2; 250/227.11, 227.14; 335/201; 340/650, 661; 385/12

(56) References Cited

U.S. PATENT DOCUMENTS

| | | |
|---|---|---|
| 3,999,074 * | 12/1976 | Callaghan ............................ 250/551 |
| 4,369,364 | 1/1983 | Kuntermann . |
| 4,461,571 | 7/1984 | Killion . |
| 4,685,018 | 8/1987 | Tada et al. . |
| 4,702,553 * | 10/1987 | Buchmuller et al. ................... 385/12 |
| 4,791,518 | 12/1988 | Fischer . |
| 4,878,144 | 10/1989 | Nebon . |
| 5,089,931 | 2/1992 | Thuries et al. . |
| 5,185,686 * | 2/1993 | Hansen et al. ......................... 361/45 |
| 5,223,682 | 6/1993 | Pham et al. . |
| 5,361,313 * | 11/1994 | O'Keefe ................................. 385/11 |
| 5,650,902 | 7/1997 | Herkenrath et al. . |

OTHER PUBLICATIONS

Urho Tuominen Oy Ltd, Switchgear Division, *UTC Arc Protection Systems—a possibility to be protected*, 2 pp. (No date).

\* cited by examiner

*Primary Examiner*—Michael J. Sherry
(74) *Attorney, Agent, or Firm*—Martin J. Moran (57) ABSTRACT

Arcing faults in electric power systems, such as switchgear, are detected by gathering light from components in the system and splitting the gathered light into two beams. The first beam is passed through a first narrow band filter to extract a wavelength characteristic of arcing in the material of the selected component, such as the copper in the switchgear conductors. The second beam is passed through a second filter having a narrow bandwidth, not including the characteristic wavelength. The extracted light signals are converted to a sensed light electrical signal and a background light electrical signal, respectively, by photodiodes and compared. If the sensed light electrical signal exceeds the background light electrical signal by a selected threshold, an output device such as a trip solenoid is actuated.

20 Claims, 8 Drawing Sheets

APPARATUS AND METHOD FOR OPTICALLY DETECTING ARCING FAULTS IN ELECTRIC POWER SYSTEMS IN THE PRESENCE OF OTHER LIGHT SOURCES

BACKGROUND OF THE INVENTION

1. Field of the Invention

This invention relates to detecting arcing faults in electric power systems and particularly within the metal cabinets of switchgear. More specifically, it relates to apparatus and the method for detecting such arcing with optical sensors which are resistant to false indications induced by other light sources such as ambient light, tungsten bulbs, fluorescent lights, flashlights and even flash bulbs.

2. Background Information

Electric power systems incorporate switches for control and protection purposes. Distribution systems which form part of the overall electric power system include main and branch power buses and circuit breakers mounted in metal cabinets to form switchgear. Interruption of current flow in the buses of the distribution system by a circuit breaker creates an arc as the contacts of the circuit breaker open. These arcs caused by interruption are contained and extinguished in the normal course of operation of the circuit breaker.

At times, however, unintended arcing faults can occur within the switchgear cabinets, such as between the buses, or between a bus and a grounded metal component. Such arcing faults can produce high energy gases which pose a threat to the structure and nearby personnel. A common approach to protecting personnel from arcing faults in switchgear has been to design the metal enclosures to withstand the blast from the arcing fault. This has been done at great additional costs due to the heavy gauge metal used and numerous weld joints needed to prevent flying debris. Even with these precautions, the blast from an arcing fault inside the switchgear cannot be contained.

Recently, methods have been developed for minimizing the severity of the blast from an internal arcing fault. These methods include pressure sensing and light detection which sense the arcing fault within the switchgear and cause a circuit breaker to trip before significant damage can result. The pressure sensing method is limited by the insensitivity of the pressure sensors. By the time cabinet pressure has risen to detectable levels, the arcing fault has already caused significant damage. The light detection methods used to date are not selective so that any light signal can trigger the sensor. Thus, a flashlight used by service personnel, or sunlight or a photoflash can falsely trigger the optical sensor. In order to avoid such false tripping of the optical sensors, it has been proposed that optical sensing be combined with current sensing either directly or by sensing the magnetic field created by the current. Unfortunately, these methods are costly and have not proven to be reliable.

There is a need, therefore, for improved apparatus and method for detecting arcing faults in electric power systems and particularly within switchgear.

More particularly, there is a need for such improved apparatus and method for detecting arcing faults which respond before significant damage has occurred and yet are reliable and resistant to false arcing fault indications.

SUMMARY OF THE INVENTION

These needs, and others, are satisfied by the invention which recognizes that light from the arcing fault contains wavelengths characteristic of the material creating the arc. Commonly, the arcing fault occurs at a bus or disconnect which are typically made of copper. Copper has a strong line emission wavelength at about 520 nm (520.820 nm). In some applications, the buses are coated with silver which also has a strong line emission characteristic wavelength of about 520 nm (521.908 nm) and another at about 546 nm (546.550 nm). Unfortunately, other light sources which can be present have a broad band continuum of wavelengths which includes 520 nm and 546 nm. This includes the common sources of light such as ambient light, tungsten bulb light, flashlight, fluorescent light and flash bulb light. Thus, merely detecting light at about 520 nm will not distinguish an arcing fault from these others sources.

In accordance with the invention, light is gathered from the components of the electrical power system of interest. This gathered light is split into two beams. Light within a first band of wavelengths which includes a predetermined wavelength characteristic of the arcing material is extracted from the first beam as the sensed light. Light is extracted from the second beam within a second band of wavelengths which does not include the predetermined wavelength as a reference for the background light. The sensed light and the background light are compared. An output indicating the presence of an arcing fault is generated based on this comparison. If an arcing fault is present, the sensed light should be much stronger, have a higher irradiance, than the background light. While the background light will also produce light in the first band of wavelengths, the irradiance will not greatly exceed that in the second band of wavelengths. Preferably, the second band of wavelengths is selected so that for the background light the signal strength in the second band of wavelengths will be greater than in the first band. To minimize the risk of a false indication, light in the first band of wavelengths must exceed that in the second band of wavelengths by a selected threshold amount before an indication of an arcing fault is generated.

The light within the first band of wavelengths is extracted from the first beam by a filter selected to pass the predetermined wavelength. The width of this first band of wavelengths can be up to about 25 nm, but is preferably about 5–10 nm. The narrower this band of wavelengths, the more discriminating is the detection, but the sensitivity is reduced as the bandwidth narrows. Light is extracted from the second beam by another filter passing light with wavelengths not including the predetermined wavelength but having a similar bandwidth. In order to more closely balance the light extracted from the two beams of gathered light, the second beam which is passed through the filter passing wavelengths of the second wavelength band which does not include the predetermined wavelength, can be also passed through a neutral density filter.

The invention is also directed to apparatus for detecting arcing faults including light gathering means for gathering light from the monitored component and splitting the gathered light into first and second beams. A first filter means extracts from the first beam light in a first wavelength band including the predetermined wavelength characteristic of the arcing material of the component. A second filter means extracts light from the second beam in a second band of wavelengths not including the predetermined wavelength. Response means generates an arcing fault signal in response to a predetermined relationship between the light passed by the first filter means and that passed by the second filter means.

Preferably, the response means comprises a first photodetector which generates a sensed light electrical signal from the filtered first beam, and a second photodetector generating a background light electrical signal from the second filtered light beam. A comparator circuit assumes a first state indicative of an arcing fault when the sensed light electrical signal exceeds the background light electrical signal by a predetermined amount. Otherwise, the comparator remains in a second quiescent state. Output means generate the signal indicative of an arcing fault in response to the first state of the comparator circuit.

In the preferred embodiment of the invention, the light gathering means comprises a bifurcated optic fiber having a first branch which generates the first beam and a second branch generating the second beam. Where a plurality of components or locations within a switchgear are to be monitored for arcing faults, the light gathering means can include additional optic fibers each having a first end aimed at a selected component or location, and a second end coupled to the bifurcated optic fiber. The bifurcated optic fiber is a bundle of optic fibers with a comb structure which splits light gathered from each of the additional optic fibers into the first light beam and the second light beam each containing light from each of the additional optic fibers. Where the invention is used in switchgear including a circuit breaker, the output means includes means tripping the circuit breaker in response to the detection of an arcing fault. Again, in the most preferred embodiment of the invention, the first filter has a bandwidth of up to about 25 nm, but preferably 5 to 10 nm and is centered at about 520 nm. In this instance, the second filter has a bandwidth which is about the same as the first filter and has a center wavelength of about 610 nm.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1A:
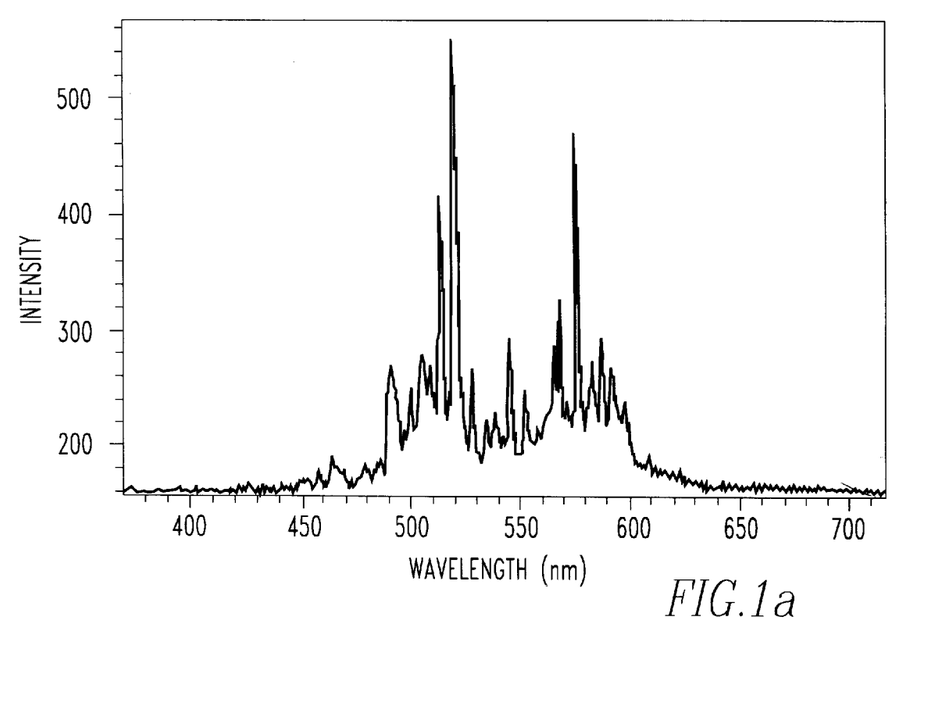
In FIGS. 1a and 1b are spectral irradiance curves for a copper arc and silver/tungsten arcing contacts, respectively.
Figure 1B:
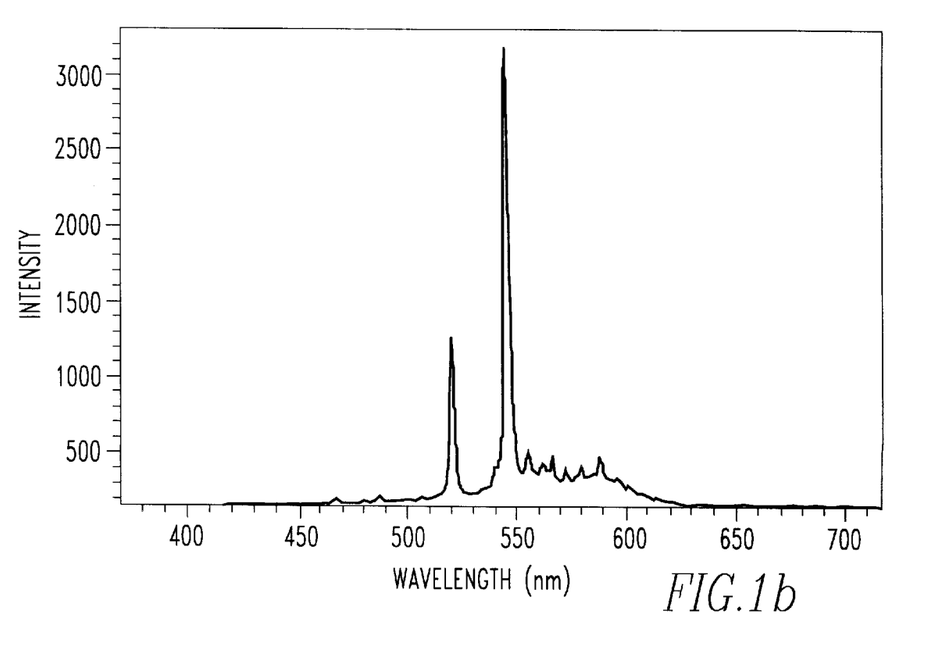
Figure 2A:
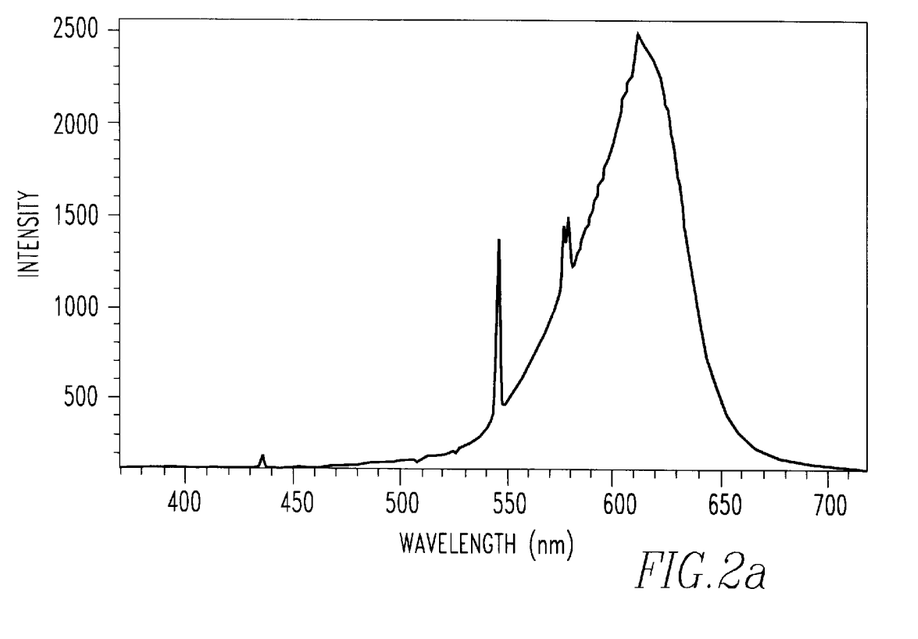
FIG. 2a–e are spectral irradiance curves for fluorescent light, a tungsten lamp, a flashlight, a photoflash, and sunlight, respectively.
Figure 2B:
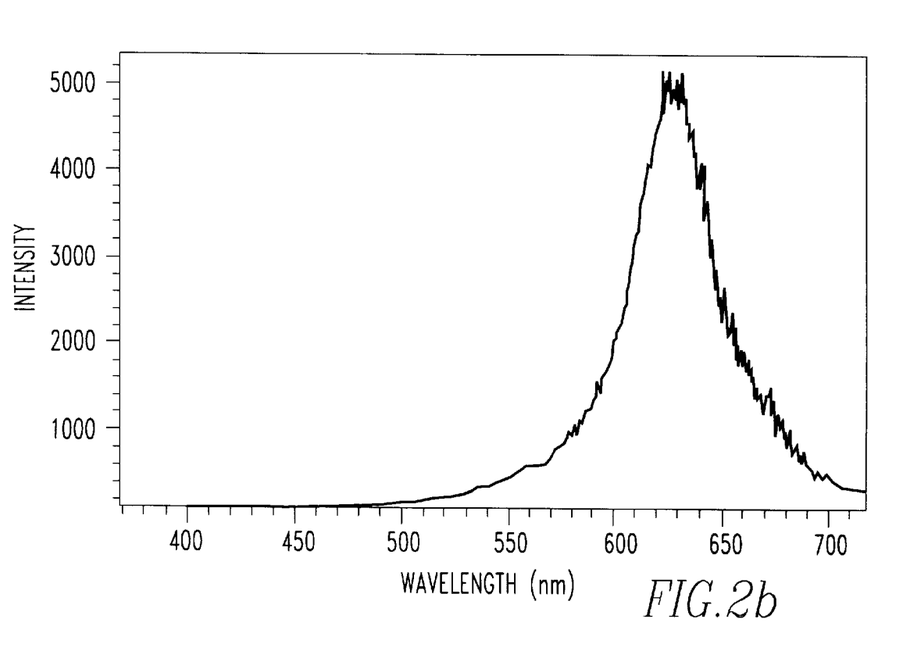
Figure 2C:
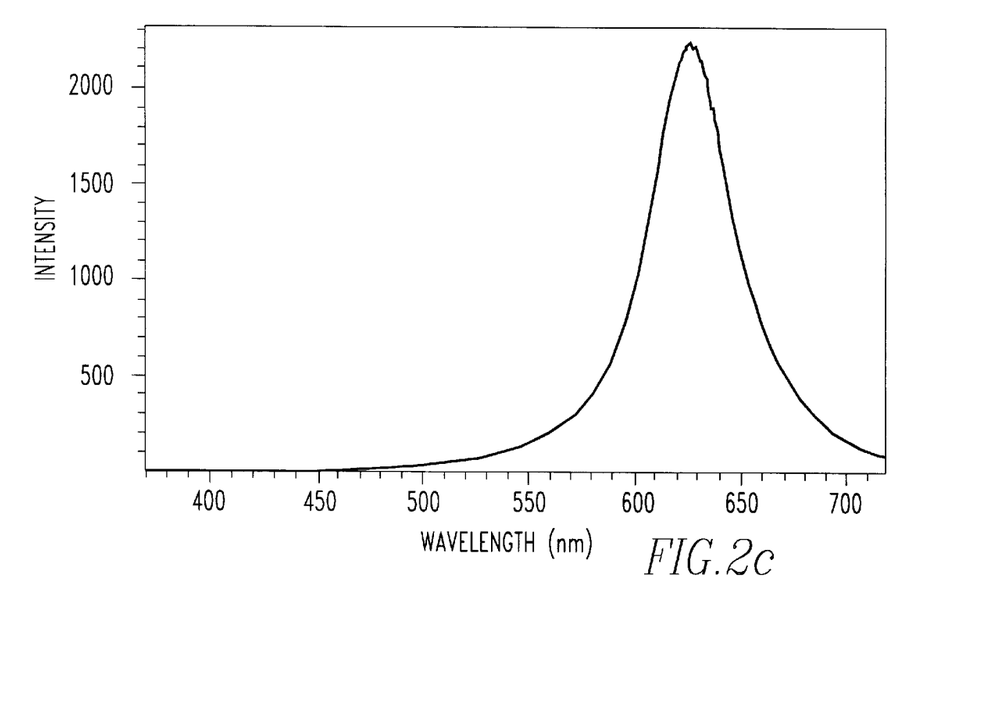
Figure 2D:
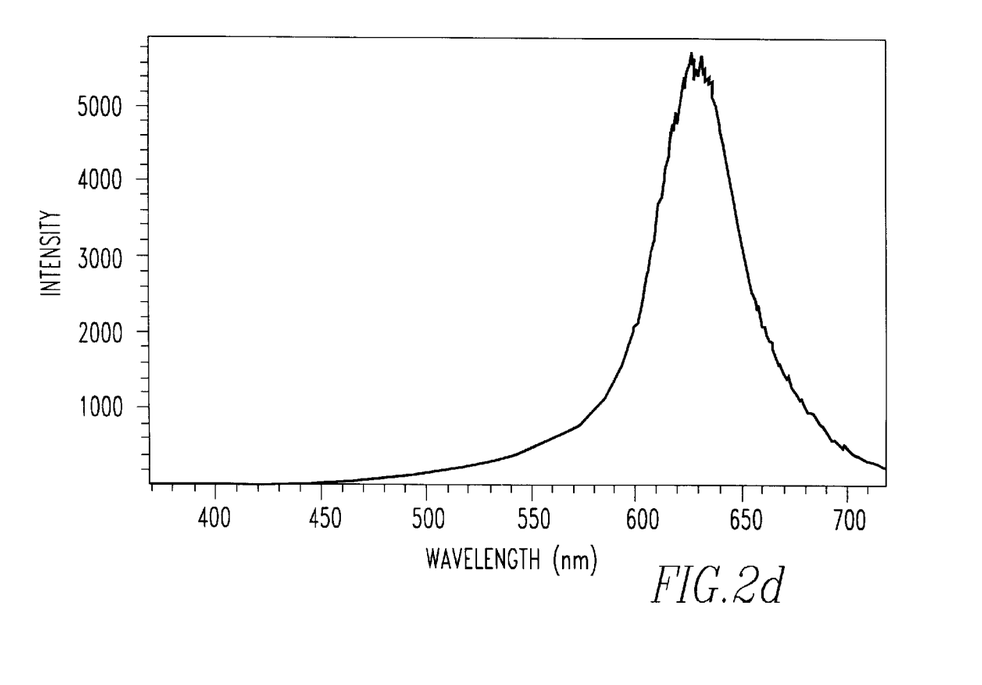
Figure 2E:
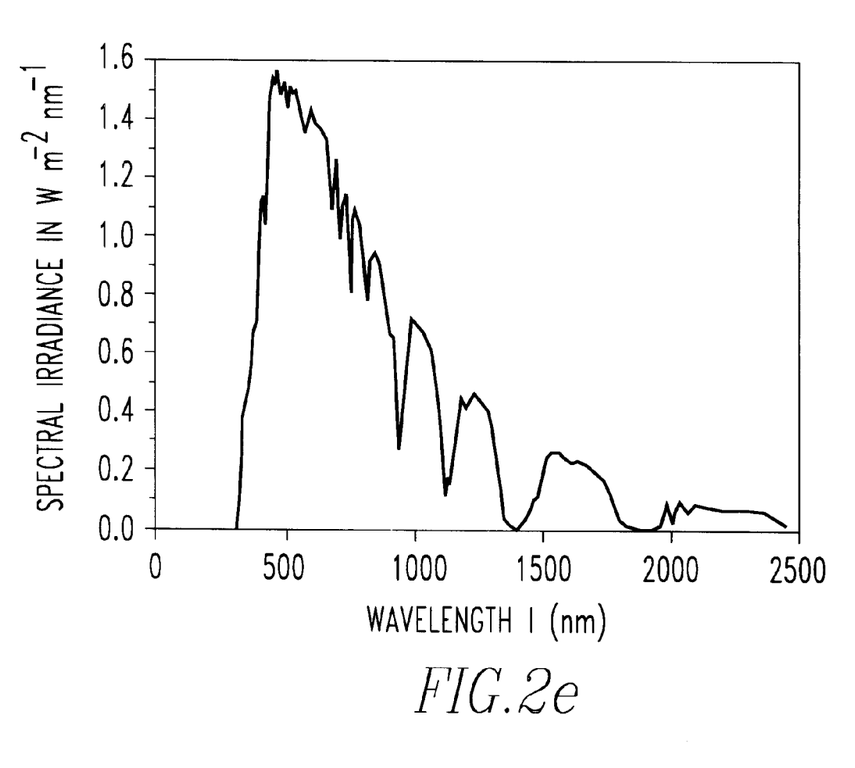

The invention is based on the recognition that arcing faults in electric power systems generate light characteristic of the arcing material. For instance, in electric power systems, this material is typically the copper used in the conductors. An example of the spectrum of a copper arc is illustrated in FIG. 1a. As illustrated, there are several emission lines with a strong peak occurring at 521.820 nm. It will also be noticed that there is an absence of peaks above 600 nm. FIG. 1b illustrates the spectrum for silver/tungsten arcing contacts. As shown, there is a strong peak at 546.550 nm, however, there is also a significant peak at 520.908 nm, close to the noted emission line for copper. Again, there is very little activity above 600 nm.

Other sources of light can be present in the environment of an electric power system. Examples of the irradiance curves for such sources are illustrated in FIGS. 2a–e which show, respectively, the curves for fluorescent light, a tungsten lamp, a flashlight, a photoflash and sunlight. These sources of background light generally have a greybody radiation signature. As can be seen, they generally have a peak occurring above 600 nm although sunlight has a broad spectrum which extends through and even below 500 nm. However, even the other background sources illustrated have a significant irradiance at 520 nm although much less than at their peaks in the low 600 nm wavelengths. Thus, merely selecting a narrow band detector centered around 520 nm is not a satisfactory answer to discriminating arcing faults, as the background light sources also included this wavelength.

In accordance with the invention, an arcing fault is detected by gathering light from components susceptible to arcing faults and splitting this light into two beams. Light within a narrow band of wavelengths which includes a wavelength characteristic of arcing from the material of the component is extracted from the first beam by a first narrow beam sense filter. Light from a second narrow band of wavelengths, not including the characteristic wavelength for the arcing fault is extracted from the second beam by a second narrow band background filter. Preferably, the second band of wavelengths is selected to have a wavelength range that has a greater intensity of the background light passed by the second or background filter than by the first or sense filter so that in the absence of an arcing fault, the light passed by the background filter will be greater than that passed by the sense filter. However, when an arcing fault is present and light is generated by the arcing fault at the characteristic wavelength of the arcing material, the output of the sense filter will exceed that of the background filter and can be used as the indication that an arcing fault is present.

Thus, for the exemplary embodiment of the invention, the sense filter was selected to be centered about 520 nm to detect the characteristic emission lines of copper and silver. The center wavelength of the background filter was selected to be 610 nm. While the selection of the center wavelength for the sensed filter is constrained by the characteristic emission lines of the arcing material, the center wavelength for the background filter has more flexibility. As mentioned, 610 nm was selected for the background filter because the intensity of this wavelength for most of these background sources was substantially more than at the 520 nm wavelength.

In accordance with the invention, the light passed by the sense filter and the light passed by the background filter are both converted to electrical signals by photodiodes. The resulting sensed light electrical signal and background light electrical signal are subtracted. In the absence of an arcing fault, the background light electrical signal will exceed the sensed light electrical signal. In the presence of an arcing fault, the sensed light electrical signal will be larger. Therefore these two electrical signals are subtracted and applied to a comparator which applies a threshold to the comparison so that an output indicating an arcing fault is only generated when the sensed light electrical signal exceeds the background light electrical signal by a set threshold amount.

The wavelength bandwidth of the sense filter and the background filter should be substantially the same. Narrowing the bandwidth increases selectivity, but reduces sensitivity. For instance, a wavelength band of about 1.5 nm provides good selectivity but reduces the sensitivity since the level of the light is reduced. On the other hand, a bandwidth which is too wide, such as, for example, above about 25 nm, reduces the selectivity (provides a lower signal to noise ratio) and could result in false arcing fault indications, no tripping with an arcing fault or delayed tripping. Thus, the bandwidth of the two filters should be below about 25 nm and preferably should be about 5–10 nm.

Figure 3:
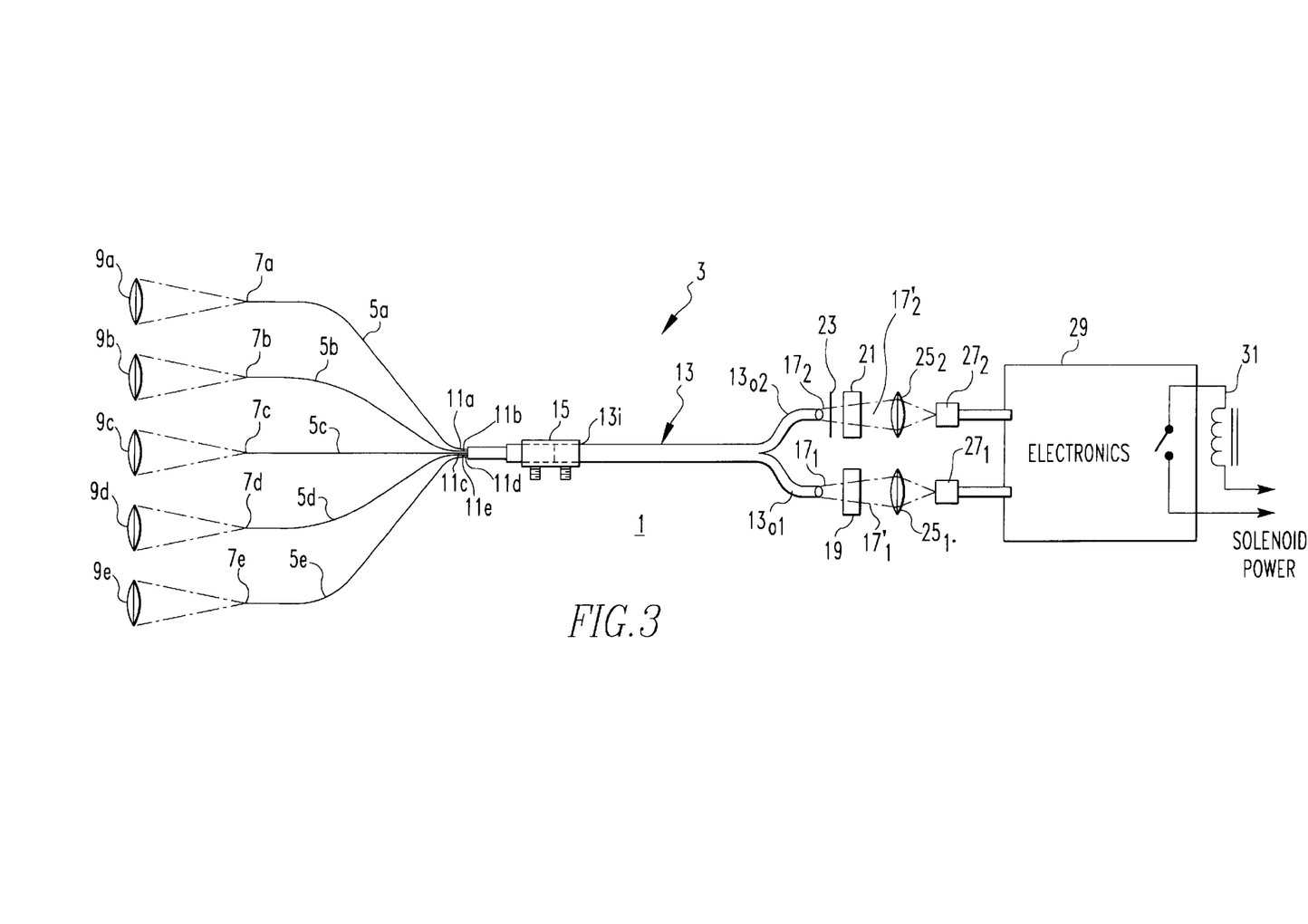
FIG. 3 is a diagram, partially schematic, of an optical arc detector in accordance with the invention.

FIG. 3 illustrates schematically an optical arc detector 1 in accordance with the invention. The detector 1 includes a light gathering section 3. The system shown as a plurality of input channels in the light gathering section 3 each provided by an optic fiber 5$a$–$e$. At a first or free end 7$a$–$e$ of each of the optic fibers is light gathering optics 9$a$–$e$ which increase the field of view of each channel. Second ends 11$a$–$e$ of the optic fibers are coupled to a bifurcated fiber optic bundle 13 by a plexiglass ferrule 15. The bifurcated fiber bundle has a single input end 13$_i$ and two output ends 13$b$ and 13$c$. This bifurcated fiber bundle has a comb structure for the individual fibers in the bundle. That is, the fibers of the bundle are smaller in diameter than the optic fibers 5 and are arranged so that light from each of the optic fibers 5$a$–$e$ is transmitted to each of the output ends 13$b$ and 13$c$ of the fiber optic bundle thereby splitting the gathered light into a first beam 17$_1$ emanating from the first end 13$_{o1}$ and a second beam 17$_2$ emanating from the second end 13$_{o2}$. The first beam 17$_1$ is passed through a first or sense interference filter 19 having a first narrow wavelength bandwidth centered on 520 nm to extract light characteristic of a copper or silver arc. In a similar manner, the second beam 17$_2$ is passed through a second or background interference filter 21 having a narrow bandwidth centered at about 610 nm. As mentioned, this latter wavelength is chosen as a center wavelength because it is not a characteristic wavelength of the arcing material, in this case, copper or silver. This second beam 17$_2$ can also be passed through a neutral density filter 23. The light 17$_1$' extracted by the sense filter and the light 17$_2$' extracted by the background filter are focused by convex lenses 25$_1$ and 25$_2$ on photodiodes 27$_1$ and 27$_2$ which convert these light signals into the sensed light electrical signal and a background light electrical signal, respectively. These two electrical signals are processed by electronics 29 in the manner discussed above so that if an arcing fault is present and therefore the sensed light electrical signal exceeds the background light electrical signal by a set threshold amount, a circuit is completed to energize an output device such as a breaker trip solenoid 31.

Figure 4:
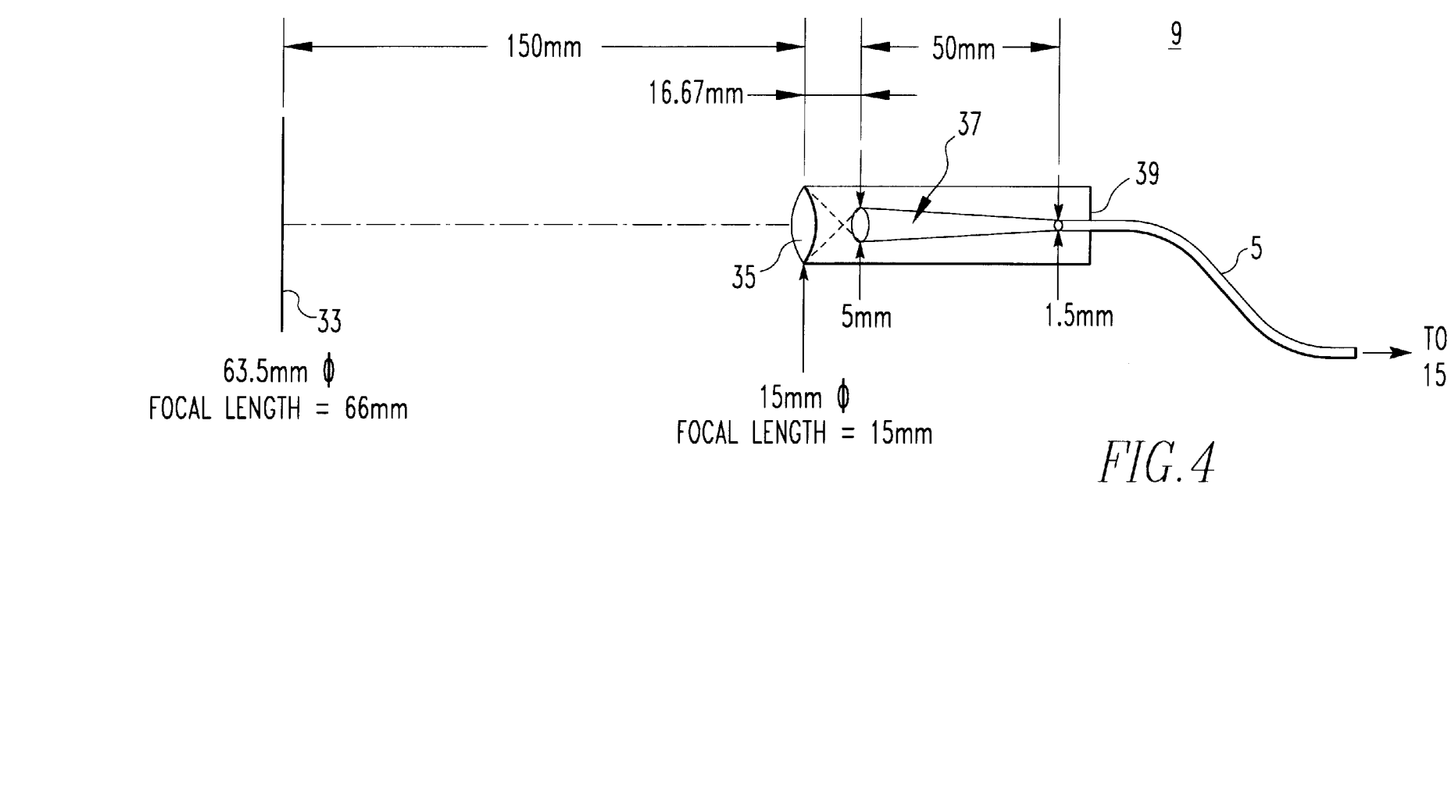
FIG. 4 is a schematic diagram showing the construction of light-gathering optics for use in the invention.

FIG. 4 illustrates an arrangement for the light gathering optics 9 which is used to increase the field of view (FOV) of the optic fibers 5. These light gathering optics 9 include a Fresnel lens 33 spaced in front of the convex lens 35 which focuses the light gathered by the Fresnel lens into an optical taper 37 in an enclosure 39. This optical taper 37 can be formed as a highly polished conical surface within the enclosure 39. The light gathering optics 9 permits each channel of the detector to monitor a larger section of the electric power system.

Figures 5, 6:
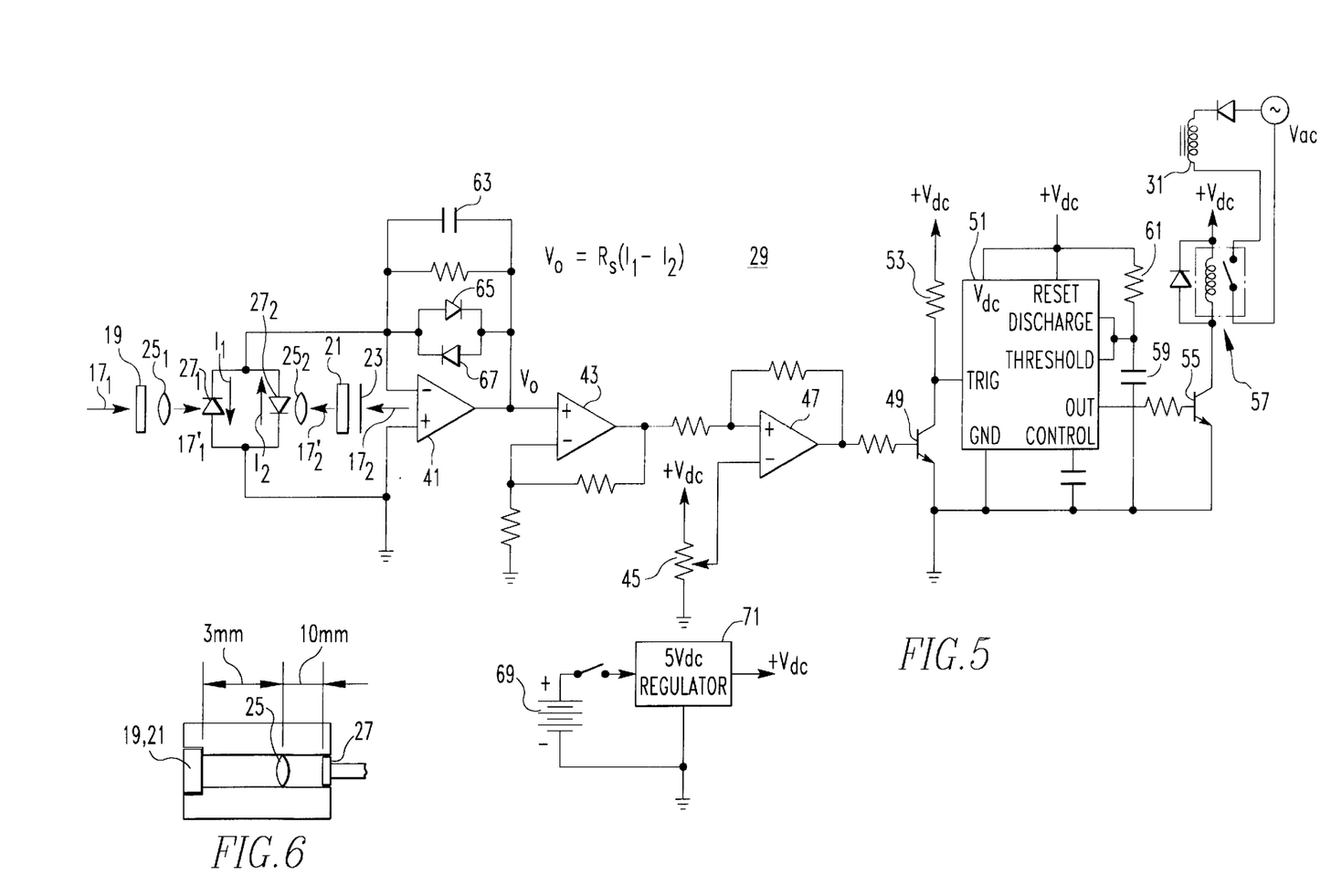
FIG. 5 is a schematic circuit diagram of the electro-optics and electronics of the detector in accordance with the invention.
FIG. 6 illustrates the optics for the photodiodes.

Turning to FIG. 5, the arrangement for generating the sensed light electrical signal and background light electrical signal are repeated schematically and the circuitry 29 for processing those electrical signals is shown in detail. As indicated, the photodiodes 27$_1$ and 27$_2$ are connected in antiparallel so that their currents subtract. This difference between the sensed light current signal and the background light current signal is converted to a voltage signal by the differential amplifier 41. The output voltage of this amplifier is $$V_o = R_f(I_1 - I_2) \tag{1}$$

This differential voltage is then amplified, such as by a factor of ten, by the operational amplifier 43. The amplified voltage is compared to a reference voltage, which is set by a potentiometer 45 and a comparator 47. This potentiometer 45 sets a threshold by which the sensed light electrical signal must exceed the background light electrical signal in order for the comparator 47 to turn on a transistor 49. The transistor 49 provides the trigger signal to a one-shot multivibrator 51. Normally, the transistor 49 is off so that a pull-up resistor 53 applies +Vdc to the trigger input of the one-shot multivibrator 51. When the sensed light electrical signal exceeds the background light electrical signal by the selected threshold, the transistor 49 is turned on pulling the trigger input of the one-shot multivibrator 51 down to ground. This causes the output of the multivibrator to go high turning on a second transistor 55 to energize an output relay 57 which is powered by the +Vdc supply. As +Vdc voltage is only 5 volts, the output relay 57 is used to turn on the trip solenoid 31 which operates at 120 volts ac. The duration of the pulse generated by the one-shot multivibrator 51 is selected to assure actuation of the trip solenoid 31 long enough to trip the breaker and is set by timing capacitor 59 and resistor 61. Normally, the capacitor 59 is charged to +Vdc. When the one-shot multivibrator 51 is triggered by the falling edge of the signal applied to its trigger input, the capacitor 59 is momentarily discharged through the "discharge" port of the one-shot. The capacitor 59 then begins to recharge with the time constant set by the resistor 61. When a predetermined threshold voltage on the capacitor 59 is reached, the one-shot multivibrator 51 resets terminating the output pulse and thereby de-energizing the relay 57 and trip solenoid 31.

Capacitor 63 is provided in the feedback path of the differential amplifier 41 for low pass filtering and frequency compensation. Back-to-back diodes 65 and 67 also in the feedback path compensate for the non-linear response of the photodiodes 27$_1$ and 27$_2$. The five volt dc voltage +Vdc is generated by a battery 69 and regulator 71.

As an alternative to the light gathering section 3 and discrete filters, lenses and photodetectors, a pair of photodiodes with the appropriate filter deposited directly to the diodes' glass cover could be used. Such integral photodiode/filter, type of photodiodes are available from the Coherent Corporation, Auburn Group. Also alternatively, the functions performed by the electronic circuitry can be implemented in a micro controller.

FIG. 6 illustrates an exemplary arrangement for the optics of the photodiodes 27$_1$ and 27$_2$. Each of the narrow band filters 19 and 21 is separately mounted in an aluminum housing 72 in spaced relation to the convex lens 25 which focuses the filtered light onto the associated photodiode 27.

Figure 7:
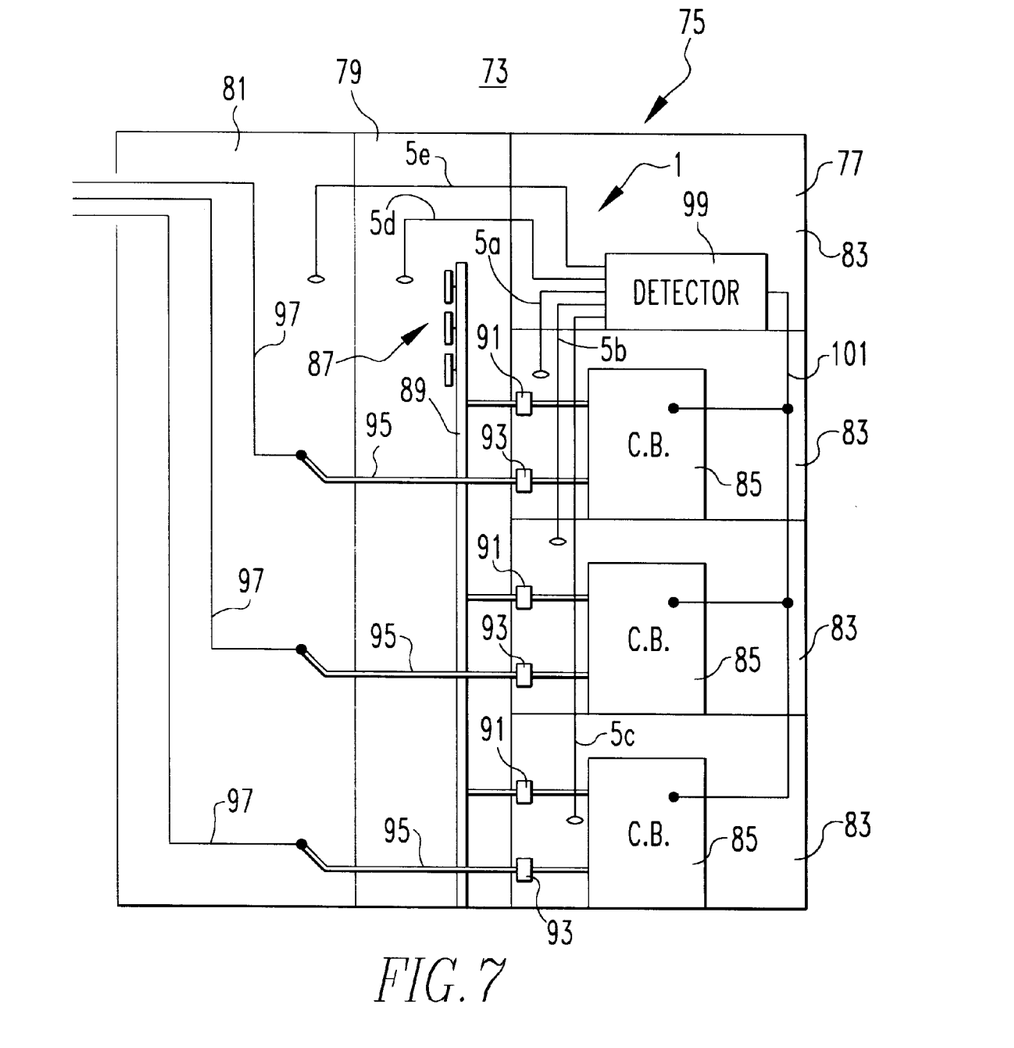
FIG. 7 is a diagram illustrating application of the invention to arc protection in switchgear.

FIG. 7 illustrates schematically an application of the optical art detector of the invention to distribution system switchgear. The switchgear 73 includes a metal switchgear cabinet 75. Typically, the cabinet 75 is divided into a forward compartment 77, a middle compartment 79 and a rear compartment 81. The forward compartment 77 is divided vertically into cells 83 in which are housed electrical switching apparatus such as circuit breakers 85. The middle compartment 79 houses rigid buses including a horizontal three-phase bus 87 which is connected to a set of vertical buses (only one visible) 89. The vertical buses are connected to the circuit breakers 85 through upper quick disconnects 91. Lower quick disconnects 93 connect the circuit breaker through runbacks 95 to cables 97 extending from the rear compartment 81.

The optical arcing fault detector 1 of the invention can be used to protect the switchgear 73 from arcing faults which can occur between any of the conductors 87–97 or between such conductors and the metal cabinet 75. Thus, the optic fibers 5*a–e* can be inserted into the cells 83, the middle compartment 79 and the rear compartment 81 along with the appropriate light gathering optics like that shown in FIG. 4 where they can gather light such as could occur from an arcing fault. The remainder of the optical arcing detector 99 can be contained in the top most cell 83 of the forward compartment 77 or any other convenient location. Upon the detection of an arcing fault, a trip signal can be sent to each of the circuit breakers 85 through a trip lead 101.

Typically, a switchgear assembly includes several sections each having a forward, middle and rear compartment like that shown in FIG. 7 mounted side-by-side. In such an installation, a common arcing fault detector can serve more than one switchgear section.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. Apparatus for detecting an arcing fault at a component of an electric power system where the arcing fault generates light at a predetermined wavelength in the presence of light from other sources which may include said predetermined wavelength, said apparatus comprising:

light gathering means aimed at said component to gather light as gathered light and splitting said gathered light into a first light beam and a second light beam;

first filter means extracting from said first beam sensed light with a first wavelength bandwidth including said predetermined wavelength;

second filter means extracting from said second beam background light with a second wavelength bandwidth not including said predetermined wavelength; and response means generating an arcing signal in response to a preselected relationship between said sensed light and said background light.

2. The apparatus of claim 1 wherein said response means comprises a first photodetector generating a sensed light electrical signal from said sensed light, a second photodetector generating a background light electrical signal from said background light and a comparator circuit comparing said sensed light electrical signal and said background light electrical signal and generating said arcing signal when said sensed light electrical signal exceeds said background light electrical signal by at least a predetermined amount.

3. The apparatus of claim 2 wherein said light gathering means includes a bifurcated optic fiber bundle having a first branch generating said first beam and a second branch generating said second beam.

4. The apparatus of claim 1 wherein said light gathering means includes a bifurcated optic fiber bundle having a first branch generating said first beam and a second branch generating said second beam.

5. The apparatus of claim 4 wherein said electric power system has a plurality of components and wherein said light gathering means comprises a plurality of optic fibers with first ends aimed at said plurality of components and second ends coupled to said bifurcated optic fiber bundle which has a comb structure splitting the light gathered from all of said optic fibers into said first light beam and said second light beam which then each contain light from each optic fiber.

6. The apparatus of claim 1 wherein said electric power system comprises switchgear including a circuit breaker and wherein said output means comprises a trip circuit tripping said circuit breaker in response to said arcing signal.

7. The apparatus of claim 1 wherein said first wavelength bandwidth of said first filter means includes 520 nm.

8. The apparatus of claim 1 wherein said first wavelength bandwidth of said first filter means is not more than about 25 nm wide.

9. The apparatus of claim 8 wherein said first wavelength bandwidth of said first filter means is about 5 to 10 nm wide.

10. The apparatus of claim 9 wherein said second wavelength bandwidth of said second filter means has a width about as wide as said first wavelength bandwidth of said first filter means.

11. The apparatus of claim 1 wherein said second wavelength bandwidth of said second filter means includes 610 nm.

12. The apparatus of claim 7 wherein said second wavelength bandwidth of said second filter means includes 610 nm.

13. A method of detecting an arcing fault at a component in an electric power system where said arcing fault generates light at a predetermined wavelength in the presence of light from other sources which may include said predetermined wavelength, said method comprising:

gathering light from said component as gathered light;

extracting light from said gathered light within a first band of wavelengths including said predetermined wavelength as sensed light;

extracting light within a second band of wavelengths not including said predetermined wavelength as background light;

comparing said sensed light to said background light; and generating an output indicating a presence of an arcing fault based on results of said step of comparing.

14. The method of claim 13 wherein said step of gathering light includes splitting said gathered light into a first beam and a second beam, wherein extracting light within a first band of wavelengths comprises passing said first beam through a first filter which passes light within said first band of wavelengths including said predetermined wavelength, and wherein extracting light within said second band of wavelengths comprises passing said second beam through a second filter which passes light within said second band of wavelengths not including said predetermined wavelength.

15. The method of claim 14 wherein said step of comparing comprises converting said sensed light to a sensed light electrical signal, converting said background light to a background light electrical signal, subtracting said background light electrical signal from said sensed light electrical signal to generate a difference signal, and generating said arcing signal when said difference signal exceeds a preselected amount.

16. The method of claim 15 wherein said steps of extracting further include balancing of irradiance of light from said other sources in said first and second beams using a neutral density filter.

17. The method of claim 14 wherein said step of gathering includes gathering light from a plurality of components in said electric power system and splitting said gathered light includes splitting light from each of said plurality of components into said first beam and said second beam.

18. The method of claim 13 wherein said step of extracting light within said first band of wavelength includes light at about 520 nm.

19. The method of claim 18 wherein said first and second bands of wavelengths are not more than about 25 nm wide.

20. The method of claim 19 wherein said first and second bands of wavelengths are about 5–10 nm wide.

* * * * *